No. 776,695. PATENTED DEC. 6, 1904.
E. L. SCHWARZ & A. G. WARD.
SUSPENSION CLAMP FOR ELECTRIC CONDUCTORS.
APPLICATION FILED APR. 10, 1903. RENEWED MAR. 26, 1904.
NO MODEL.
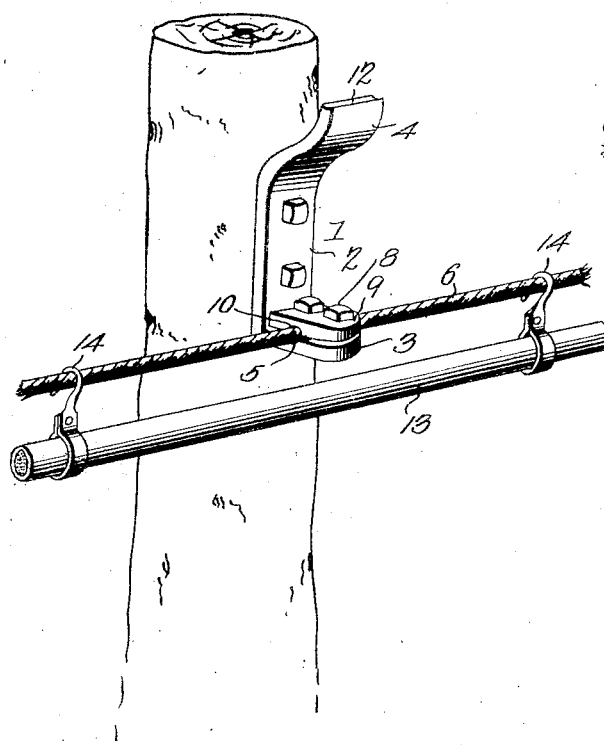
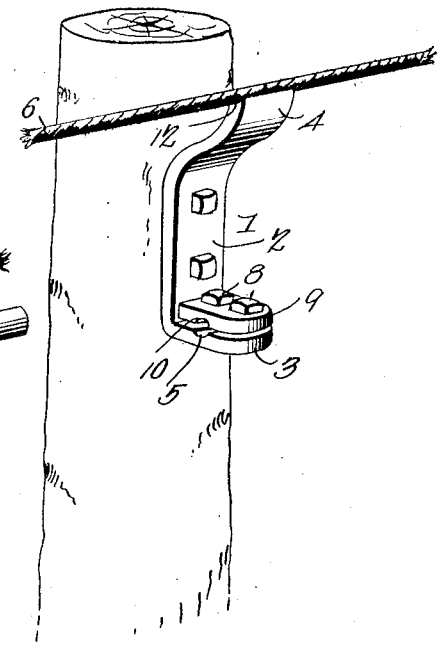
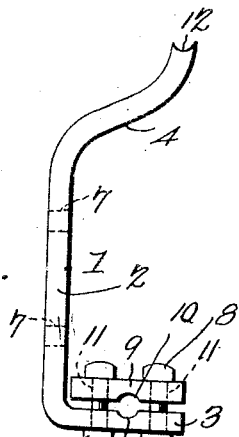
Witnesses
E. F. Stewart
Baxter Monton
E. L. Schwarz
A. G. Ward Inventors
by C. A. Snow & Co.
Attorneys No. 776,695.

Patented December 6, 1904.

UNITED STATES PATENT OFFICE.

EDWARD LORENZ SCHWARZ AND ALBERT GRANT WARD, OF BELLE-VILLE, ILLINOIS.

SUSPENSION-CLAMP FOR ELECTRIC CONDUCTORS.

SPECIFICATION forming part of Letters Patent No. 776,695, dated December 6, 1904.

Application filed April 10, 1903. Renewed March 26, 1904. Serial No. 200,194. (No model.)

*To all whom it may concern:*

Be it known that we, EDWARD LORENZ SCHWARZ and ALBERT GRANT WARD, citizens of the United States, residing at Belleville, in the county of St. Clair and State of Illinois, have invented a new and useful Suspension-Clamp for Electric Conductors, of which the following is a specification.

This invention relates to combined suspension-clamps and transfers for electric cables, more especially to suspension-clamps for a wire from which the cable proper is suspended by means of hooks.

In suspending an aerial electric cable of considerable size the common practice is to employ a strong wire held in suitable clamps provided on the poles and to support the cables by means of hooks secured to said cables at comparatively short intervals and passing over the wire held in the clamps upon the poles. In order to suspend the cable, it must be unwound from a reel upon the ground, carried up to the wire, and the hooks attached to the cable placed in position upon the wire as the cable is drawn upward. In order to suspend a cable of considerable length upon a wire-support in the usual way, it is necessary to have a man on each pole to lift the cable-supporting hooks off the wire and pass them around the wire-clamp at the pole as the cable is drawn along from pole to pole. This necessitates a pause every few moments, making the process a slow one, and requires the service of a considerable number of men to suspend a cable of any but very short length.

The object of this invention is to obviate both of the disadvantages of the common method of procedure sketched above; and the invention consists, generally speaking, in a hanger for the cable-supporting wire, which is commonly known as the "messenger-wire," which comprises a permanent clamp in which the messenger-wire may be securely held and a temporary support upon which the messenger-wire may be placed during the operation of suspending the cable, the temporary support being so formed that when the messenger-wire is resting thereon the cable-supporting hooks may be drawn along the messenger-wire without coming into contact with the temporary support.

In describing the invention reference will be had to the accompanying drawings, in which is illustrated the preferred form of employment of the invention, corresponding parts being designated by the same characters of reference throughout the various views.

In the drawings, Figure 1 is a view in perspective of the upper portion of the pole for supporting electric conductors provided with our improved suspension-device and showing the messenger-wire clamped securely in position with a cable suspended therefrom. Fig. 2 is a similar view, but with the messenger-wire resting upon the temporary support. Fig. 3 is a view in side elevation of the suspension device detached from the pole.

Referring specifically to the drawings, 1 designates the main member of our suspension device, comprising a central base portion 2, having openings 7 for spikes or bolts, a lug 3 at the lower end thereof, which is disposed at right angles to the base portion, and a curved extension at the upper end of the base portion, (designated 4.) The horizontal lug 3 is provided on its upper surface with a groove 5, which forms a seat for the messenger-wire 6 and is pierced with openings for the passage of clamping-bolts 8. In order to secure the messenger-wire firmly in position in the groove 5, a clamp-plate 9 is provided, having a groove 10 corresponding in position to the groove 5 on the lug 3 and having openings 11 for the passage of bolts 8.

The extension at the upper end of the base portion 1 is curved, as shown, and the end thereof is directed upward. Across the end of the extension 4 a groove 12 is formed to afford a seat for the messenger-wire 6 when placed in position, as indicated in Fig. 2. The groove formed in the extension 4 should be as deep as possible without having the edges thereto project upward beyond the center of the messenger-wire in order to afford as secure a support for the messenger-wire as possible without in any way interfering with the passage of the cable-supporting hooks along the messenger-wire when resting in the groove.

Ordinarily the diameter of the messenger-wire will be approximately equal to the thickness of the material of which the curved extension is made, and consequently the groove at the upper end of the extension may be semicircular in cross-section, or nearly so.

When the messenger-wire is in position in the clamp, as shown in Fig. 1, it is obvious that the cable 13 cannot be drawn along under the messenger-wire without causing the cable-supporting hooks 14 to come into contact with the clamp; but when the messenger-wire rests in the groove 12 at the end of the extension 4 the hooks 14 will slide freely along the messenger-wire without coming into contact with the support for the wire at all.

In using our invention for suspending a cable the messenger-wire is supported in the groove on the extension 4, and the cable-supporting hooks 14 are placed in position on the messenger-wire as fast as the cable is drawn upward to the wire. The mode of raising the cable to the messenger-wire does not enter into this invention, and any ordinary course of procedure in raising the cable may be followed. As the cable is raised and the hooks are placed in position on the messenger-wire it can be drawn forward under the messenger-wire until it has been strung over all the spaces which it is desired to cover.

As the curved extension 4 presents no obstruction to the passage of cable-supporting hooks along the messenger-wire, it will readily be understood that when the messenger-wire is supported in the grooves 12 the cable may be drawn along the messenger-wire without its being necessary to have a man at each pole to lift the cable-supporting hooks around the support for the messenger-wire. Consequently it will be apparent that when it is impossible to secure a large force of men for carrying on the work of suspending the cable this form of support will be of great advantage, for one man may ascend each pole in succession and shift the messenger-wire from the clamp at the bottom of the hanger to the temporary support at the top, and after this has been done a small number of men will be able to draw the cable upward and pull it along under the messenger-wire until the suspension from the entire space has been completed. After the cable has been put in position on the messenger-wire one man will be able to ascend each pole successively and return the messenger-wire from the temporary support to the clamp, where it may be secured in position.

It is to be understood that while we have shown and described the preferred form of the employment of the invention we do not desire to be limited to the exact form, proportions, or mode of assemblage of the elements thereof, but reserve the right to make such changes therein as do not depart from the spirit of the invention.

Having described the construction and operation of our invention, what we claim as new, and desire to secure by Letters Patent, is—

1. The combination of a device of the character specified, of a clamp for permanently supporting a wire, and a temporary support above said clamp and integral with the base thereof upon which a wire may be supported during the operation of suspending a cable therefrom.

2. The combination in a device of the character specified, of a clamp for permanently supporting the wire, a temporary support above said clamp and integral with the base thereof adapted to support the wire from beneath only, and to present no obstruction to the passage of cable-supporting hooks along the wire.

3. The combination in a device of the character specified, of a clamp for permanently supporting a wire, and a temporary support formed integral with the base of said clamp comprising an upwardly-curved arm having a groove in the end thereof to form a seat for the wire.

4. A suspension device comprising a base adapted to be secured to a suitable support, a horizontal lug at the lower end of said base having a groove on its upper surface to afford a seat for the wire, a clamping-plate, clamping-bolts passing through said clamp-plate and said lug, and an upwardly and outwardly curved extension from said base having the end thereof grooved to form a temporary support for the wire.

In testimony that we claim the foregoing as our own we have hereto affixed our signatures in the presence of two witnesses.

EDWARD LORENZ SCHWARZ.
ALBERT GRANT WARD.

Witnesses:
F. J. TECKLENBURG,
H. L. WARD.